United States Patent [19]
Bendayan

[11] 3,778,799
[45] Dec. 11, 1973

[54] SAFETY DEVICE FOR PIPE LINES UNDER GAS PRESSURE

[75] Inventor: Jacques Bendayan, Lyon, France

[73] Assignee: Cables de Lyon-Alsacienne-Geoffroy. Delore, Lyon, France

[22] Filed: Mar. 28, 1972

[21] Appl. No.: 238,772

[52] U.S. Cl. .................. 340/235, 55/275, 55/387, 55/512, 73/28, 333/98 P, 340/239 F
[51] Int. Cl. ........................................... G08b 21/00
[58] Field of Search .............. 340/235, 239 F, 240, 340/242; 333/98 P; 55/275, 387, 512; 73/28

[56] References Cited
UNITED STATES PATENTS

| | | | |
|---|---|---|---|
| 1,538,652 | 5/1925 | Poth | 55/512 X |
| 2,452,615 | 11/1948 | Thomson | 340/235 UX |
| 2,752,586 | 6/1956 | Jordan | 340/235 |
| 3,304,783 | 2/1967 | Quigley | 73/28 X |

Primary Examiner—John W. Caldwell
Assistant Examiner—Daniel Myer
Attorney—Paul M. Craig, Jr. et al.

[57] ABSTRACT

A safety device for interrupting the communication between two pipe line sections, which are under the pressure of gas, in response to detection of propagation or infiltration of a liquid from one section toward the other one, characterized in that it comprises an enclosure including at each of the ends thereof a compartment respectively connected to one of said sections, and in the central portion thereof a chamber separated from each of said compartments by means of a filter retaining a swelling agent which becomes impermeable under the effect of moisture.

11 Claims, 1 Drawing Figure

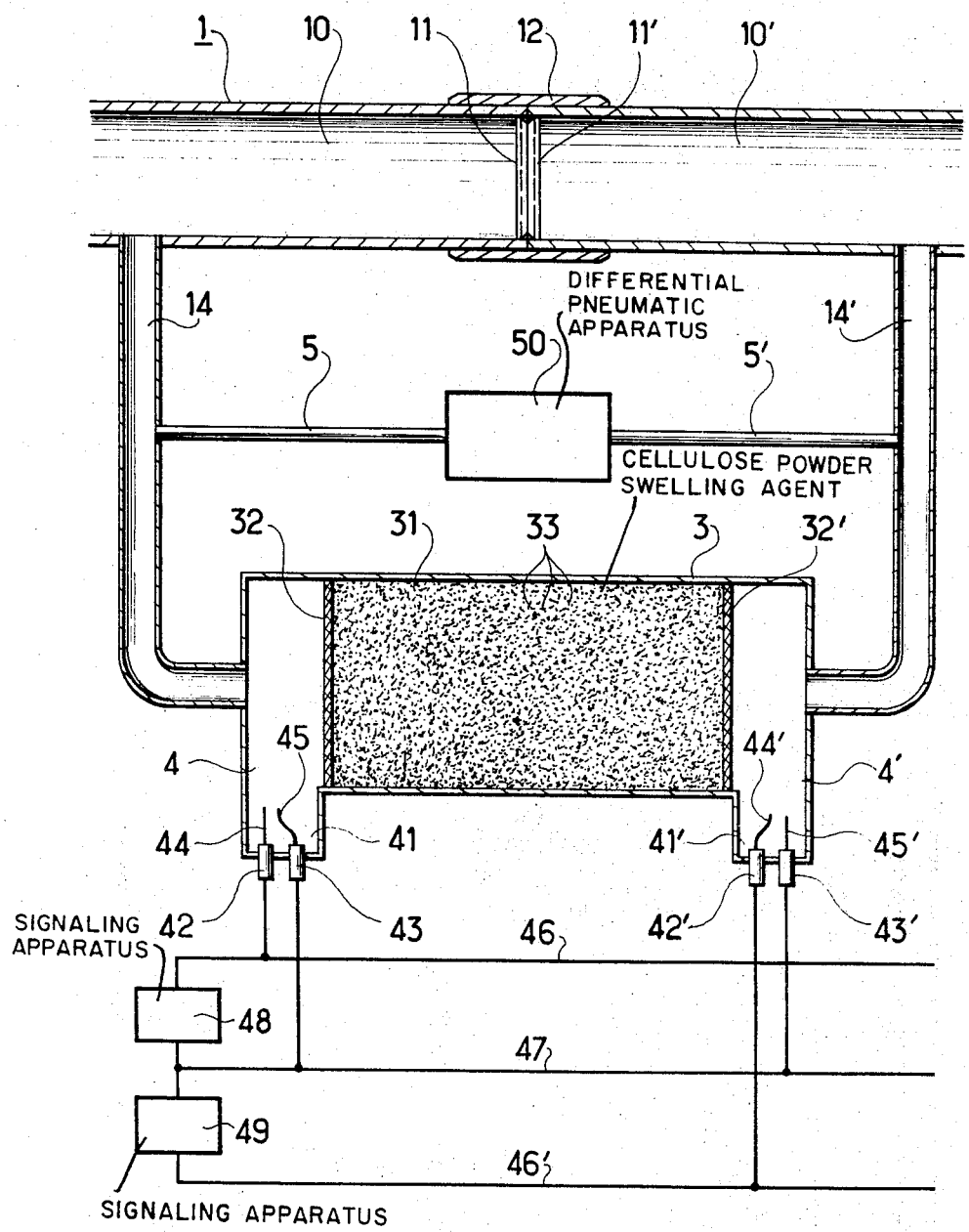

SAFETY DEVICE FOR PIPE LINES UNDER GAS PRESSURE

The present invention relates to a safety device for pipe line systems which are under gas pressure, and more particularly to the application of safety devices to pipe lines or network connections consisting of lines of waveguides.

It is known that waveguides consist of a metallic tubing which is placed under a dielectric screen and at the interior of which there is provided an appropriate gaseous dry fluid, such as air, or nitrogen, for example.

The interest in use of such waveguide lines resides in the possibility of transmitting therethrough simultaneously a considerable number of telecommunications over a large distance, in the order of one or several hundreds of miles, at very high frequencies, for example, in the gigaHertz range.

Under these conditions, the maintenance of a line is of fundamental importance since disturbances and discontinuities in the structure of these metallic pipes which may be produced during the formation and use thereof are related in direct proportion to the performance of such a line. Therefore, it appears expedient to place such pipe lines under a mechanical protection and out of reach of external forces by burying them rather deeply in the ground.

Nevertheless, these lines still remain vulnerable since slight mechanical accidents which may happen unexpectedly to the pipe lines in the ground entail the risk of producing leaks of gaseous fluid and/or of making possible the infiltration of moisture into the waveguide. Such infiltrations are undesirable since they affect the entire pipe line or connection and thereby make it unusable. In addition thereto, the tracing of such defects is difficult particularly when the line is very long.

It is the object of the present invention to provide for a safety device which makes it possible to limit the effects of accidental penetration of water into pipe lines maintained under gas pressure, and for easily tracing any possible defects therein.

The present invention is directed to a safety device which interrupts the communication between two adjacent line sections maintained under gas pressure whenever there is a propagation or infiltration of water from one section to the other, and is characterized in that it consists of an enclosure comprising at each of the ends thereof a compartment connected respectively to one of the aforementioned sections, and in the central portion thereof a chamber separated from these compartments by means of a filter retaining an agent which swells up or expands so as to become impermeable due to the effect of moisture. This agent which becomes inflated upon contact with moisture may be, for example, cellulose powder, or a product having similar properties.

According to other features of the present invention, each compartment comprises means for detecting the presence of fluid, which means may consist either of electrodes or of a floating device.

Each of the pipe sections is advantageously in operative engagement with a pressure intake, and the two pressure intakes may be connected to a differential pneumatic apparatus.

The particular features and advantages of the present invention will become more apparent from the following description thereof, which is non-limiting and is to be taken by way of example only, as illustrated in the single FIGURE of the accompanying drawing, which is a schematic diagram, partly in section, of one embodiment of the present invention.

In this single FIGURE, reference numeral 1 identifies a portion of a waveguide under gas pressure and consisting of two adjacent sections, such as 10 and 10', separated from each other by either one or several membranes, such as 11 and 11', the junction being enclosed by a sleeve 12.

The safety device comprises a fluid-tight enclosure 3 which is separated by means of filtering partitions 32 and 32' into a central chamber 31 and two end compartments 4 and 4'. The end compartments 4 and 4' are connected respectively to the two pipe line sections 10 and 10' by means of auxiliary pipe lines 14 and 14'. The central chamber 31 is filled with a product 33, such as cellulose powder, which swells up or expands and becomes impermeable to fluids upon contact with moisture.

In the lower portions 41 and 41' of each of the end compartments 4 and 4', which constitute small tanks, electrodes 44, 45, 44' and 45' are mounted on lead-in insulators 42, 43, 42' and 43', respectively.

The electrodes 44 and 45 are connected by means of wires 46 and 47 to a signaling apparatus 48, which may include its own power source, and the electrodes 44' and 45' are connected by means of wires 46' and 47 to a signaling apparatus 49, which may also include its own power source, so that connection across lines 46 and 47 or lines 47 and 46' will operate the respective signaling apparatus.

The auxiliary pipe lines 14 and 14' are equipped with pressure intakes 5 and 5' connected to a differential pneumatic apparatus 50.

The operation of the device proposed by the present invention proceeds as follows. When water infiltrates in a pipe line section, for example in section 10, this water eventually penetrates into the end compartment 4 by way of the auxiliary pipe line 14, accumulates in the recovery tank 41 and eventually penetrates into the central chamber 31 through the filtering partition 32. Due to the effect of the moisture, the cellulose powder adjacent this partition 32 becomes inflated rapidly until it has totally obstructed any passage of gas and liquid toward the compartment 4', and the section 10' is thus protected.

Conversely, if the infiltration of water comes from the section 10', the water eventually penetrates into the compartment 4' by means of the auxiliary pipe line 14' and into the central chamber 31 through the wall 32'. The cellulose powder adjacent the wall 32' then becomes inflated by the moisture and obstructs any passage of gas and liquid in the direction of the section 10, which is thereby effectively protected.

Furthermore, in the presence of an accumulation of moisture in the recovery tank 41, an electric connection is established between the electrodes 44 and 45, which closes the circuit of the indicating apparatus 48. If the penetration of moisture is effected in the compartment 4', the accumulation of moisture in the tank 41' establishes an electric connection between the electrodes 44' and 45', which closes the circuit of the indicating apparatus 49, which is actuated to produce a selective lateral signaling, from either the left or the right, of the pipe line section in which the penetration of the moisture has been produced.

It should be understood that this signaling system may of course be simplified by connecting in parallel the pairs of electrodes 44, 45, and 44', and 45', for example by means of wires 46, 47, to a single indicating apparatus 48. In that case, there is no more indication of the section in which the infiltration has been produced, but the signaling line comprises then no more than two conductors.

The methods of providing for the signaling device as described hereinabove may also be attained in a different fashion, for example by exchanging for the electrodes of each of the chambers a set of electric contacts which are controlled by a floating device.

The pipe lines are normally maintained under gas pressure by the very nature thereof for the advantageous reasons described above; however, when there exist in one or several pipe line sections slight leaks of gas due to defects of construction or due to accidental causes without, however, being necessarily accompanied by a penetration of water, these leaks give rise to an abnormal flow of gas from one section to the other, which abnormal flow may be detected and controlled.

For example, if a leak of gas should happen to be produced in section 10', the section 10 supplies or discharges gas toward the section 10', and by flowing through the safety device, will undergo a loss of charge which is transmitted to the differential pneumatic apparatus 50 by reason of the tapping via the pressure intakes 5 and 5'.

The differential pneumatic apparatus which may be of any appropriate type, such as a manometer or manual contactor, makes it possible to obtain information relative to the direction of the gas flow from one section toward the other, its amount, and its location. It may even be connected to a telesignaling means to provide a remote indication of the problem.

It is understood that the operation as described above is valid also for specifically for lines of waveguides other types of lines which are designed to be kept under gas pressure, or even designed for lines transporting gas.

The present invention is not limited to the embodiment which has been described hereinabove, but rather is susceptible to any changes and modifications which appear suitable to one skilled in the art.

What is claimed is:

1. A safety device for interrupting the communication between two adjacent sections of pipe under gas pressure in response to the infiltration of water from one section toward the other, comprising a fluid-tight enclosure divided by first and second filtering partitions into a central chamber and respective first and second end compartments connected respectively to said adjacent pipe sections, and a swelling agent disposed in said central chamber which becomes impermeable to fluids upon contact with water.

2. A safety device as defined in claim 1 wherein each of said first and second end compartments further include means for detecting the presence of water.

3. A safety device as defined in claim 2 wherein said means for detecting the presence of water comprise a pair of closely spaced electrodes connected to a signaling apparatus.

4. A safety device as defined in claim 2 wherein said means for detecting the presence of water comprise contact means for pro-ducing an electrical connection between a pair of terminals in the presence of water and first and second signaling apparatus connected respectively to the contact means in said first and second end compartments.

5. A safety device as defined in claim 2 wherein said means for detecting the presence of water comprise contact means for pro-ducing an electrical connection between a pair of terminals in the presence of water and a single signaling apparatus connected in parallel to said contact means in said first and second end compartments.

6. A safety device as defined in claim 1, further including differential pressure detecting means connected between said adjacent sections of pipe for detecting differences in gas pressure between said sections.

7. A safety device as defined in claim 6 wherein each of said first and second end compartments further include means for detecting the presence of water.

8. A safety device as defined in claim 1 wherein said sections of pipe are electrical waveguides connected together at a junction formed by a fluid-tight membrane, said fluid-tight enclosure being connected to respective sides of said membrane.

9. A safety device as defined in claim 8, further including differential pressure detecting means connected between said adjacent sections of pipe for detecting differences in gas pressure between said sections.

10. A safety device as defined in claim 9 wherein each of said first and second end compartments further include means for detecting the presence of water.

11. A safety device as defined in claim 1 wherein said swelling agent is cellulose particles.

* * * * *